United States Patent

[11] 3,575,522

[72] Inventor Samuel Melenchuk
 Indianapolis, Ind.
[21] Appl. No. 756,673
[22] Filed Aug. 30, 1968
[45] Patented Apr. 20, 1971
[73] Assignee General Motors Corporation
 Detroit, Mich.

[54] TURBINE COOLING
 6 Claims, 6 Drawing Figs.
[52] U.S. Cl. .................................................. 415/112,
 416/96
[51] Int. Cl. .................................................. F01d 5/08
[50] Field of Search.......................................... 253/39.15,
 39 (R 1), 77 (CK), 77 (C); 416/90, 93, 95, 96, 97,
 221; 415/115, 178, 112, 180, 198, 199

[56] References Cited
 UNITED STATES PATENTS
2,807,434 9/1957 Zimmerman .................. 253/39.15
3,034,298 5/1962 White .......................... 253/39.15(X)
3,198,485 8/1965 Melenchuk .................... 253/77(CK)

FOREIGN PATENTS
619,018 4/1961 Canada ......................... 416/97
678,085 8/1952 Great Britain ................. 416/96
549,780 8/1956 Belgium ........................ 253/77(C)
620,877 3/1949 Great Britain ................. 253/77(C)
809,268 2/1959 Great Britain ................. 253/39.15

Primary Examiner—Everette A. Powell, Jr.
Attorneys—Paul Fitzpatrick and E. W. Christen ABSTRACT: An arrangement for cooling the rim of the first to second stage spacer of a multistage turbine of a gas turbine engine. Cooling air supplied to the forward face of the first stage wheel flows through blade slots below the blade roots and is discharged from the turbine wheel over the outer surface of the adjacent spacer through the clearance gap between it and the inner shroud of the second stage nozzle. Some of the spaces under the blade bases are closed by inserted air seals to regulate the quantity of cooling air and spacer temperature drop desired.

INVENTOR
Samuel Melenchuk
BY
Paul Fitzpatrick
ATTORNEY

INVENTOR.
Samuel Melenchuk
BY
Paul Fitzpatrick
ATTORNEY

TURBINE COOLING

"The invention herein described was made in the course of work under a contract or subcontract thereunder with the Department of Defense."

My invention is directed to improving the cooling of turbines, more specifically to improving the cooling of the first to second stage spacer and the first and second stage rotor wheels of a known type of high temperature turbine which forms a part of the well-known Allison Model 501 engine, military designation T56. It is applicable, however, to other engines.

It has long been realized that one of the important factors limiting the service life of high temperature turbines such as gas turbines is the maximum temperatures to which the parts are subjected and also the cycling of temperatures which gives rise to thermal fatigue. For this reason, many arrangements for cooling turbines to permit the use of higher temperature motive fluid, to minimize temperatures at the hottest parts of the rotor, as well as to reduce thermal cycling ranges, have been proposed.

Examples of arrangements proposed to cool the rims of turbine rotors may be found, for example, in Halford Pat. No. 2,401,826 for Turbine, Jun. 11, 1946, Stalker Pat. No. 2,489,683 for Turbine, Nov. 29, 1949, Zimmerman No. 2,807,434 for Turbine Rotor Assembly, Sept. 24, 1957, White No. 3,034,298 for Turbine Cooling System, May 15, 1962; and British Pat. No. 800,602 of Blackwell et al. for Improvements in or Relating to Jet Propulsion Gas Turbine Engines, Aug. 27, 1938.

Cooling the interstage spacer is, in some cases, more difficult than cooling the wheels. This is because the spacer, being less massive, cycles more rapidly in temperature, setting up a greater degree of stress. The problem is most acute when such an interstage spacer is of approximately the same diameter as the adjacent turbine wheels and is located immediately adjacent the inner shroud of the interstage nozzle. One approach to minimizing or solving this work problem lies in employing a diaphragm extending inwardly from the nozzle so that the interstage seal is of small diameter and remote from the motive fluid path. This forms a part of the approach in the White patent referred to above. However, this approach has its disadvantages, and, in the case of the specific engine to which my invention is primarily directed, such an approach would involve a complete redesign of the turbine. By my invention, a very important improvement in cooling of the interstage spacer has been made without any extensive redesign or modification of the existing engine, which is in service in large numbers.

The principal objects of my invention are to improve the service life of gas turbine engines and reduce the expense of maintaining such engines; to provide improved means for cooling an interstage spacer of a gas turbine; to provide improved rotor cooling adapted to the structure of an existing gas turbine engine having a large diameter interstage spacer between first and second rotor wheels, and to provide improved and readily controllable means for conducting cooling air through a turbine wheel to an interstage spacer downstream of the wheel.

The nature of my invention and the advantages thereof will be clear to those skilled in the art from the succeeding detailed description of the preferred embodiment of the invention and the accompanying drawings thereof.

Figure 1:
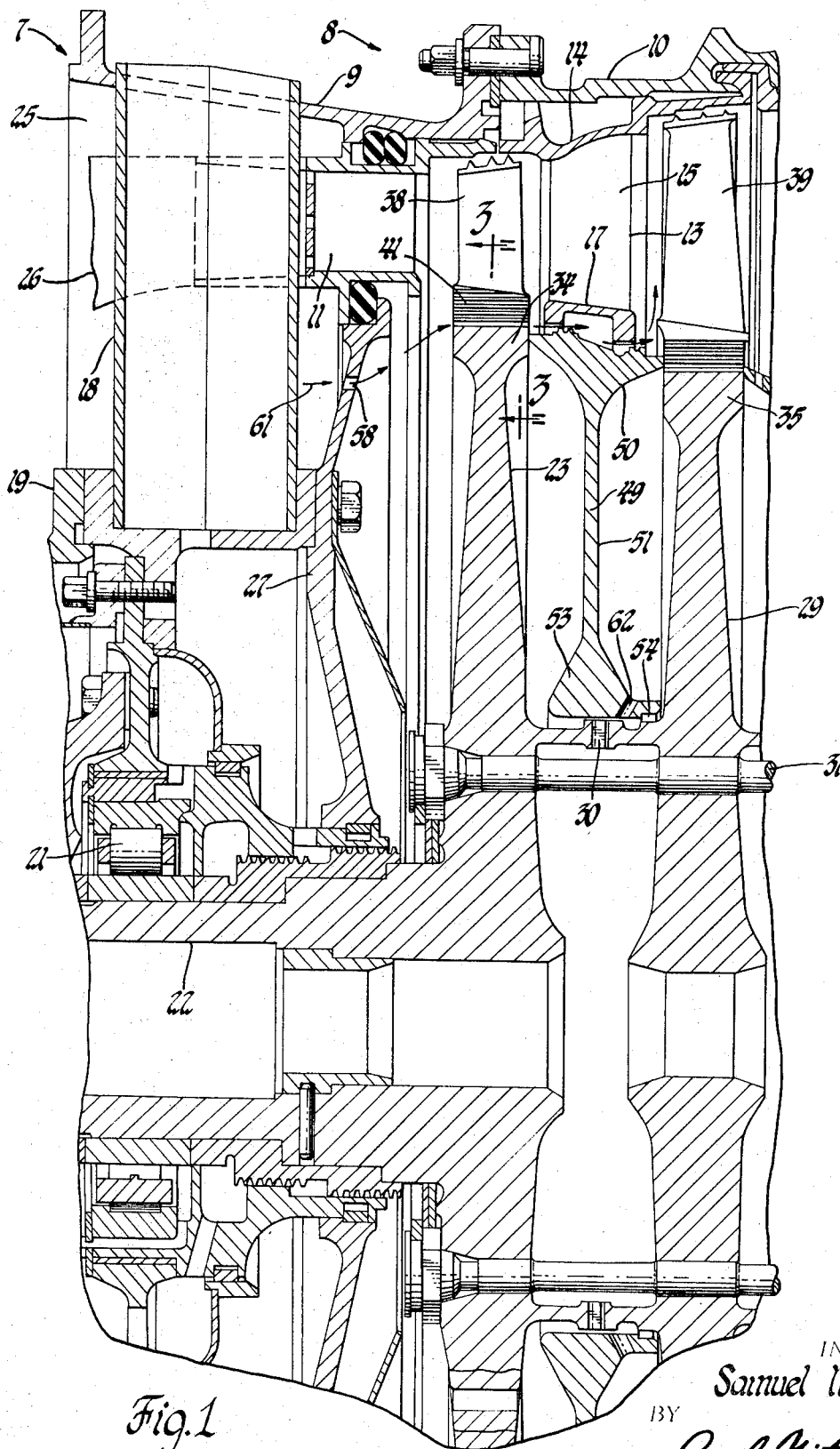
FIG. 1 is a sectional view of the first two stages of a gas turbine of known type incorporating a cooling system according to my invention, taken on a plane containing the axis of rotation of the turbine.

Referring first to FIG. 1, a multistage turbine 7 of a gas turbine engine comprises a stator 8 including a first or upstream casing section 9 and a second casing section 10 bolted to the first casing section. The first section mounts a first stage turbine nozzle 11 and the second section mounts a second stage turbine nozzle 13 having an outer shroud 14, vanes 15, and an inner shroud 17. The details of this structure are immaterial to my invention. Struts 18 connect a bearing support 19 to the casing section 9. The support 19 mounts a roller bearing 21 for a turbine shaft 22 and mounts various sealing structures immaterial to the present invention. It may be pointed out that this arrangement is similar to that shown in Dison U.S. Pat. No. 3,053,590 for Shaft seal, Sept. 11, 1962. A first stage turbine wheel 23 is integral with shaft 22. The downstream end of a combustion space 25 is defined between the casing section 9 and the bearing support 19. Combustion liners 26 (shown fragmentarily) connect to the first stage nozzle 11 to discharge motive fluid into the first stage rotor wheel through the first stage nozzle vanes. A diaphragm 27 bolted to the support 19 closes the gap between the turbine shaft and the first stage nozzle 11. A second stage turbine wheel 29 is coupled to the first stage wheel 23 by splines 30 and a ring of tie bolts 31 which also attach other wheels, not shown. The wheels 23 and 29 abut at and are aligned by the splines 30. The turbine wheels have rims 34 and 35, respectively, which may be the same except dimensionally. Blade slots 37 of the well-known multiple dovetail or fir-tree configuration extend across the rims of both wheels as shown more clearly in FIGS. 2 and 3, to mount the annular array of blades 38 of the first stage 39 of the second stage. As shown clearly in FIG. 3, the first stage blades have multiple dovetail roots 41 engaged in the blade slots so as to retain the blades radially of the rotor. The structure of the second stage blade root is similar.

Figure 4:
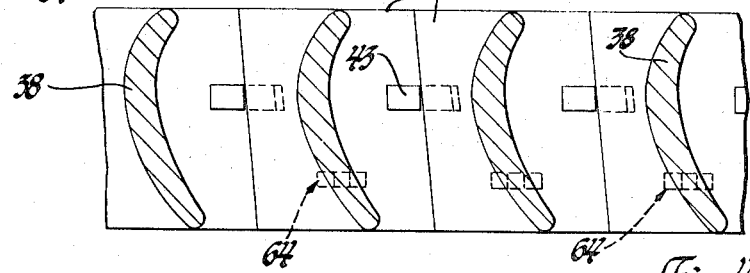
FIG. 4 is a developed view of a portion of the rim with the blades in section on the plane indicated by the line 4—4 in FIG. 3.

Each blade includes a platform 42 joining the root to the blade portion, these platforms being of generally parallelogram outlined as shown in FIG. 4 and abutting to define the inner boundary of the motive fluid path through the rotor stage. Suitable means are provided for retaining the blades against sliding axially of the rotor, the preferred structure in the first stage being that shown in my Pat. No. 3,198,485 for Turbine Blade Lock, Aug. 3, 1965. In this structure, every blade except one is retained by a small key 43 having projections 45 engaging under the root of the next adjacent blade. The keys 43 are disposed in a circumferential slot 46 in the rotor and in radial slots 47 in one edge of each blade platform. The last blade to be fitted may be retained by a pin or otherwise.

The turbine rotor also includes a first to second stage spacer or spacer disc 49 (see also FIG. 1). This disc includes a rim 50 bearing against the rims of wheels 23 and 29, a web 51, and a hub 53 piloted on a shoulder 54 of the second stage wheel. Rim 50 includes labyrinth sealing ridges 55 which cooperate with flanges 57 of the second stage inner shroud 17. In this connection, the drawings illustrate the parts of the engine in their cold condition and, due to relative expansion of the parts, the ridges 55 line up with the flanges 57 when the engine is in normal operation. The blades 39 of the second stage wheel are retained in their slots by the rear face of spacer flange 50 and by an additional spacer downstream (not shown).

The foregoing may be considered to be a description of the engine for which my invention was conceived or of the preferred environment of the invention.

Figure 2:
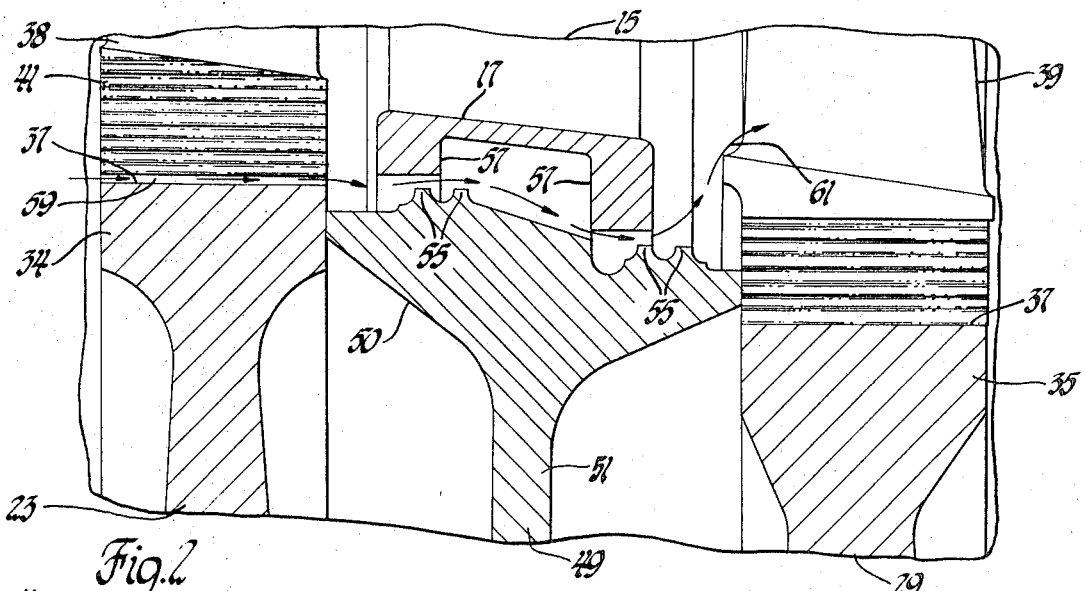
FIG. 2 is an enlarged view of the rotor rim portion taken on a radial plane as in FIG. 1.

Proceeding now to a consideration of the matter of cooling the first and second stage wheels and particularly the spacer 49, this is accomplished according to my invention by circulating cooling air through the rim of the first stage wheel so as to be directed axially of the turbine into the narrow gap between the spacer rim and the second stage nozzle inner shroud, as indicated by the arrows 61 on FIGS. 1 and 2. To provide the cooling air, a ring of holes 58, of appropriate size and number, for cooling air are provided in the diaphragm 27. These holes pass combustion chamber jacket air from space 25 which, while hot, is much cooler than the motive fluid passing through the nozzle 11. The air flowing through holes 58 discharges into the space between diaphragm 27 and first stage wheel 23. A small part of it flows between nozzle 11 and the first stage wheel into the motive fluid path through blade 38. The greater part of the cooling air flows through the passages 59 defined by the clearance between the tips of the blade roots and the bases of the blade slots. The passages 59 terminate immediately upstream of the gap between the outer surface of spacer rim 50 and the inner shroud 17 and at the radius from the turbine axis of the labyrinth seal gap.

Flow across the rim of the first stage wheel is promoted by the pressure drop across the first stage blades and the flow through the labyrinth seal by the pressure drop across the second stage nozzle. After flowing through this seal and thus over the face of the spacer rim, the air is discharged into the motive fluid path and the second rotor stage as indicated by the arrow 61. The air thus provides a cool air film over the interstage spacer, isolating it to a large extend from the hot motive fluid.

Additional air may be circulated from the interior of the rotor through holes 62 in the spacer hub and between the rear face of spacer 50 and the front face of the blade roots of the second stage or through the clearance between the second stage blade roots and their slots to a point downstream of the second stage. This cooling circuit has nothing to do with the present invention.

Figure 3:
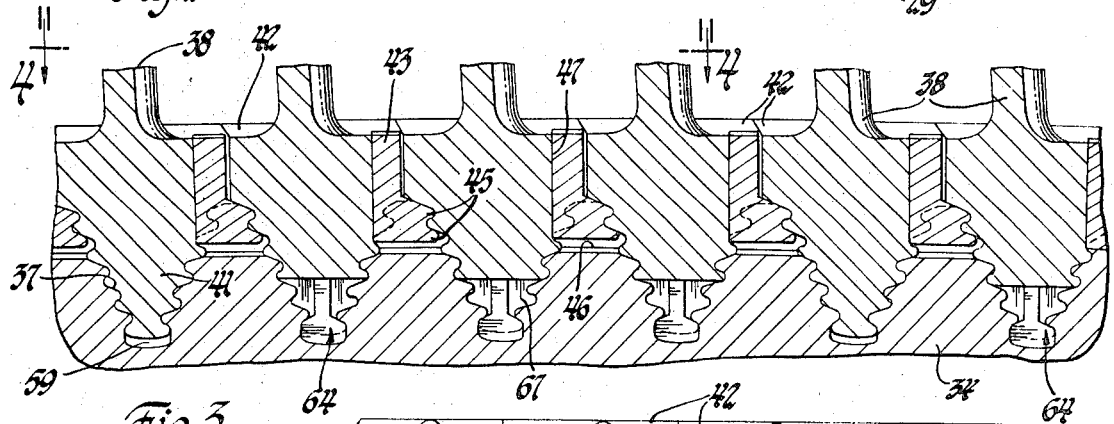
FIG. 3 is a cross section through the rim taken on the plane indicated by the line 3—3 of FIG. 1.
Figure 5:
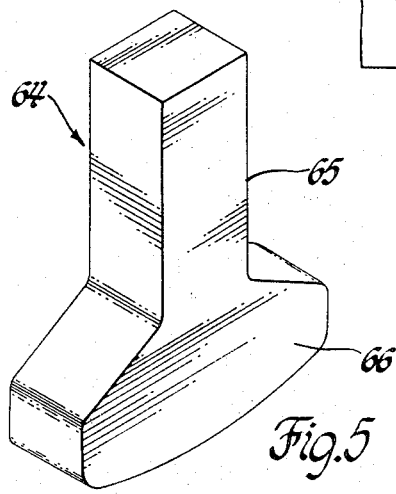
FIG. 5 is an axonometric view of an air seal.

Since there are 102 blades in the first stage of the particular turbine being considered, the number of passages 59 is greater than is desirable or necessary. The desired velocity axially of the engine of the cooling air discharged to the spacer 49 is best maintained by closing some of the passages. According to my invention, a very simple and positive means for closing as many of the passages as may be desired is available. Specifically, in this particular embodiment approximately three-quarters of the passages are closed. These passages are closed by air seals 64 (FIGS. 3,4, and 5) which are small T-shaped sheet metal parts having a stem 65 and a head 66. The head 66 fits the bottom of the blade slot 37 under the lowest serration, which retains the seal, to close the passage 59 and the stem 65 extends radially outward, being lodged in a transverse slot 67 in the bottom portion of the blade root. As illustrated in FIG. 3, four of the six passages are closed by air seals 64. The preferred location of these seals axially of the wheel is shown clearly in FIG. 4. Obviously, the cooling flow may be readily adjusted to suit changing demands or conditions by inserting a greater or smaller number of the air seals 64.

Figure 6:
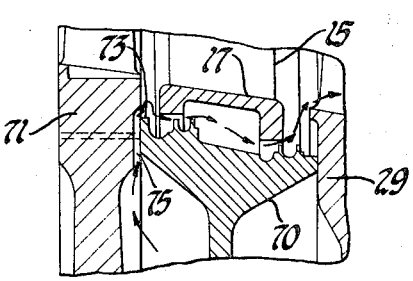
FIG. 6 is a partial sectional view illustrating a prior art arrangement for turbine cooling.

The nature and advantages of my invention may be better appreciated by consideration of the relatively unsatisfactory prior art structure on which it is an improvement, illustrated in FIG. 6, this being a sectional view similar to those of FIGS. 1 and 2. In this case the spacer rim 70 corresponding to rim 50 of the improved turbine bears against the rim 71 of the first stage wheel and the rim of the second stage wheel 29. In this structure the rim 70 includes in it a radially extending lip 73 at its forward edge bearing against the rim 71 of the first stage wheel and the rear end of the blade roots of that wheel. A number of radial grooves 75 are provided in the rear face of the rim 71. Cooling air in this case is introduced between the forward face of the interstage spacer and the first stage wheel, flows radially outward through the passages defined by grooves 75, and is intended to be circulated over the spacer rim. Experience with this type of cooling has shown it to be relatively unsatisfactory, inasmuch as the spacer rim runs much hotter than was expected or desired. My analysis leads me to conclude that, because of the initial radial flow of the cooling air from slots 75 it tends to flow outward over the outside of shroud 17 or to flow outward enough to mix with the hot motive fluid before being circulated through the labyrinth seal by the second stage nozzle pressure drop.

With the prior structure, a service life of 1500 hours was established for the interstage spacer. In an effort to increase this service life, the amount of cooling air circulated through the structure shown in FIG. 6 was increased by over 400 percent, but instrumentation showed that the temperature was not significantly improved. Tests of the structure of my invention as shown in FIGS. 1 and 2 have shown the following highly important improvement: It has reduced the spacer rim temperature from 1400° F. to 1200° F. It has also been beneficial to the first and second stage rims by reducing the first stage rim temperature from 1300°to 1000°and the second stage rim from 1125°to 1030°. With this improvement in cooling it is expected that a 7000 hour life expectancy for the interstage spacer can be attained. These FIGS. attest to the significance of the improvement in the turbine cooling and, as will be apparent, it has not involved any general redesign of the turbine which would render it impossible to substitute improved parts for those now in service in the same turbine.

The detailed description of the preferred embodiments of the invention for the purposes of explaining the principles thereof is not to be considered as limiting or restricting the invention, since many modifications may be made by the exercise of skill in the art.

I claim:

1. A turbine comprising, in combination, a stator including a first stage nozzle and a second stage nozzle; a rotor including a first stage wheel, a second stage wheel, and a spacer mounted between and rotating with the said wheels, the wheels and spacer having abutting rims and the wheels having blades mounted on and extending from the rims; the outer surface of the spacer rim being slightly spaced from the second stage nozzle to define a radial gap between the spacer rim and nozzle; means in the gap providing a labyrinth seal to minimize bypassing of the second stage nozzle by motive fluid; and means for conducting cooling air to the forward face of the first stage wheel; the first stage rim defining passages through the rim for flow of cooling air from the forward to the rear face of the rim terminating in alignment with the said radial gap, the passages discharging cooling air jets axially of the rotor directed into the said radial gap to deliver the cooling air into the labyrinth seal so as to provide a film of cooling air over the outer surface of the spacer rim flowing from the forward edge to the rear edge of the spacer rim.

2. A turbine as recited in claim 1 in which the rim defines blade mounting slots and the slots define the said cooling air passages.

3. A turbine as recited in claim 2 including air seals blocking some but not all of the said cooling air passages.

4. A turbine as recited in claim 1, the first stage wheel rim having dovetail slots extending across the rim and the blades having dovetail roots lodged in the slots, the blade roots having clearance from the bottoms of the slots to define cooling air passages extending axially of the rotor through the rim, air seals disposed in some of the blade slots closing the said passages, each air seal having a dovetail interlock with the walls of the blade slot to retain it radially of the rotor and being interlocked with the blade root to retain the air seal axially of the rotor, and means cooperating with the wheel and blade roots retaining the first stage blades axially of the rotor.

5. A turbine rotor comprising, in combination, a wheel having a rim, a row of blades mounted on the rim, the rim having dovetail slots extending across the rim and the blades having dovetail roots lodged in the slots, the blade roots having clearance from the bottoms of the slots to define cooling air passages extending axially of the rotor through the rim, air seals disposed in some of the blade slots closing the said passages, each air seal having a dovetail interlock with the walls of the blade slot to retain it radially of the rotor and being interlocked with the blade root to retain the air seal axially of the rotor, and means cooperating with the wheel and blade roots retaining the blades axially of the rotor.

6. A rotor as recited in claim 5 including also an interstage spacer disposed and of and adjacent to the wheel rim and having an outer surface located to be bathed by air flowing from the said cooling air passages.

PO-1050
(5/69)

UNITED STATES PATENT OFFICE
CERTIFICATE OF CORRECTION

Patent No. __3,575,522__ Dated __April 20, 1971__

Inventor(s) __Samuel Melenchuk__

It is certified that error appears in the above-identified patent and that said Letters Patent are hereby corrected as shown below:

Column 3, line 21, "extend" should read -- extent

Column 4, line 75, delete "and" (first occurrence) and insert -- downstream --.

Signed and sealed this 20th day of June 1972.

(SEAL)
Attest:

EDWARD M. FLETCHER, JR.
Attesting Officer

ROBERT GOTTSCHALK
Commissioner of Patents